United States Patent Office 3,062,750
Patented Nov. 6, 1962

3,062,750
TREATMENT OF ZINC SULFIDE PHOSPHORS
Jacob Quentin Umberger, Holmdel, N.J., and Charles Frederick Wahlig, Claymont, Del., assignors to E. I. du Pont de Nemours and Company, Wilmington, Del., a corporation of Delaware
No Drawing. Filed Aug. 19, 1959, Ser. No. 834,628
12 Claims. (Cl. 252—301.6)

This invention relates to a method for improving the properties of phosphor particles and more particularly to a method for treating silver-activated zinc sulfide type phosphors to improve their body color and resistance to poisoning by metallic impurities. This invention is a continuation-in-part of applicants' copending application Serial No. 773,552, filed November 13, 1958, abandoned March 16, 1960.

Zinc sulfide phosphors are prepared by firing pure zinc sulfide with one or more activators, an example of which is silver, and usually a halide flux, at a temperature usually between 500 and 1200° C. Often, however, unincorporated silver activator remains on the surface of the phosphor calcine after firing, darkening the body color of the phosphor and reducing its luminescent intensity. Various aqueous washing solutions have been proposed to remove this unincorporated silver, e.g., aqueous solutions particularly those having a pH below 5 and containing thiourea, thiosulfates, thiocyanates or iodides. The proposed washing procedure is covered by assignee's application of Umberger, Serial No. 672,567, filed July 18, 1957, now U.S. Patent 2,965,580, issued December 20, 1960.

Zinc sulfide type phosphors have been coated with a white, insoluble precipitate such as non-luminescent zinc sulfide to improve free flow. Also, certain coatings such as silica or phosphates are known to improve the adhesion to glass.

Phosphors of the sulfide-type are generally more sensitive to metallic impurities than oxide-type phosphors. Some metallic impurities such as nickel, cobalt or iron reduce the original luminescence of the phosphor and are called "poisons." Others, such as copper and manganese, are unwanted activators of luminescence since their introduction produces a new emission band which competes with and reduces the desired emission. Impurities can enter either before or after calcining the phosphor.

The phosphors obtained by the aqueous washing treatment of the above-identified Umberger application while having improved properties are particularly susceptible, after their surfaces have been cleaned, to contamination by copper, nickel, and iron.

An object of this invention is to provide a method for improving the properties of phosphor particles. Another object of this invention is to provide a method for treating activated zinc sulfide type phosphor particles to improve their resistance to contamination by metallic impurities. A further object of this invention is to provide a method for treating silver-activated zinc sulfide type phosphors to improve body color. Other objects will appear hereinafter.

These and other objects are accomplished in accordance with the invention by the process for improving the properties of a metal-activated zinc sulfide phosphor which comprises contacting the phosphor in an aqueous medium containing a silver complexing agent having a stability constant, K, with the metal activator greater than $10^7$, zinc ions and a water soluble sulfide, said aqueous medium having a free hydrogen ion concentration ranging from $10^6/K$ to $10^{-13}/K_B$, wherein $K_B$ is the basic dissociation constant of the complexing agent.

A silver complexing agent is one which is able to form complex salts in the particular system in question. The stability constant, K, of the silver complexing agent is illustrated as follows wherein $Ag^+$ is the silver ion, X is the silver complexing agent and $n$ is the number of molecules of the complexing agent required to form the complex:

$$Ag^+ + nX \rightleftarrows AgX_n^+$$

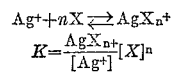

Examples of silver complexing agents and their corresponding stability constants useful in this invention are: alkali, ammonium, substituted ammonium and alkaline earth metal iodides ($K=10^{14}$), bromides ($K=10^9$), thiocyanates ($K=4\times10^{10}$), thiosulfates ($K=10^{13}$), thiourea ($K=10^{13}$) and other thio-compounds with K greater than $10^7$ such as alkylthiourea, alkyl substituted thioureas (e.g. methyl, ethyl, etc.), and thiosemicarbazide.

The basic dissociation constant, $K_B$, of the silver complexing agent is illustrated as follows using thiourea as an example:

$$(H_2N)_2CS \cdot H_2O \rightleftarrows (H_2N)_2CSH^+ + OH^-$$

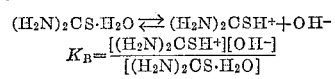

For further information on stability constants and basic dissociation constants see Theory of the Photographic Process by Mees, Revised Edition, Macmillan Company (1954), page 711.

Although the complexing agents are spoken of as silver complexing agents, they are also operable with copper and gold, the other members of group IB of the periodic table of elements.

The upper limit of hydrogen ion concentration is reached when the complexing agent is no more than 90 percent in the inactive protonated form or conversely no less than 10 percent is in the active complexing form. This is illustrated by the following using thiourea as an example:

The proton $H^+$, takes the place of and prevents the silver, copper or gold ions from being complexed. The inactive form will exist when the hydrogen ion concentration becomes so great that hydrogen ions add to the complexing agent, i.e., when the hydrogen ion concentration exceeds $10^{-13}/K_B$.

In the most general aspect of the invention the treatment of the phosphor may consist of either a single bath or two separate solution baths. If two baths are employed, the first is selected from those described in assignee's Umberger application Serial No. 672,567 (U.S. Patent 2,965,580), which contain acid and a silver complexing agent; the second contains zinc and sulfide ions wherein either the zinc ion or the sulfide ion is introduced after the phosphor has been added to a solution containing one of these ions.

In a preferred aspect of the invention, however, the treatment is accomplished in one bath containing dissolved hydrogen sulfide and a silver complexing agent with the zinc ion already present in soluble salt form on the surface of the phosphor due to the reaction between the zinc sulfide and the halide flux during calcining. The amount of water soluble zinc salt on the surface of the phosphor may vary widely depending on the technique used during calcining but it is preferable for the purposes of this invention to have from 0.3 to 4.5 mole percent available on the phosphor surface. These salts may be $ZnCl_2$ and/or $ZnSO_4$. Such a bath, before contact with the phosphor, may be either basic, neutral, or acidic, but increases remarkably in acidity upon contact with the phosphor.

Another useful variant is to add both zinc and sulfide ions to the acid complexing agent solution. Still another useful variant is to obtain zinc and sulfide ions via partial solution of the phosphor in strongly acid complexing agent solution followed by the addition of a base, usually a weak base, e.g., $Na_2SO_4$ or $NaHCO_3$, to reprecipitate the zinc sulfide in non-luminescent form on the surface of the phosphor particles.

The one- and two-bath treatments are equally capable of producing the desired improvements.

Phosphors which have improved poison-resistance and body color are prepared by slurrying the unwashed, halide-fluxed, silver-activated zinc sulfide phosphor particles with a solution containing a silver complexing agent, preferably thiourea, generally present in a concentration of 1 to 50 percent based on the weight of the treating solution, and 1.8 mole percent hydrogen sulfide. After this treatment the phosphor can be washed with water and is ready for use.

The zinc sulfide phosphors are prepared by firing silver-actuated pure zinc sulfide by procedures known in the art. The other raw materials are of "reagent" grade and are available from commercial sources.

EXAMPLE I

A luminescent silver-activated zinc sulfide phosphor, which has been prepared by calcining zinc sulfide with a silver compound containing 0.028% silver based on the zinc sulfide and 3.5 percent magnesium chloride and 4.2 percent barium chloride as fluxes, was observed to have a grayish body color and to be susceptible to contamination by copper salts. Copper salts introduced an undesirable greenish emission when heated with the calcine at a temperature of 300° C. The calcine was slurried with water containing dissolved hydrogen sulfide gas in an amount equal to 3.0 mole percent of the zinc sulfide, whereupon the pH of the slurry was measured and found to be 2.0. The sulfuretted water was filtered off, and the phosphor washed with pure water and dried. Comparison of the treated phosphor with the original calcine showed that the reflectance at 450 millimicrons had increased from 74.5% to 76.5%, and the intensity of the undesirable green emission due to copper salt contamination was decreased to 20% of that of water washed calcine by the treatment according to this invention. The mode percent of $H_2S$ in this and the following examples is based on the weight of zinc sulfide.

EXAMPLE II

The calcine of Example I was slurried with 5.0 ml. of 10 percent thiourea solution per gram of phosphor and 3.0 mole percent of $H_2S$ in water solution, whereupon the pH of the slurry was measured and found to be 2.7. The phosphor was finished as in Example I. Comparison of the treated phosphor with the original calcine showed that the reflectance at 450 millimicrons had increased from 74.5 percent to 92.1 percent, and the green emission due to copper contamination relative to the water-washed control had decreased to 7 percent. The treated phosphor calcine was found to be improved in whiteness of body color and resistance to copper contamination.

EXAMPLE III

The calcine of Example I was slurried with 5.0 ml. of 1.5 percent thiourea solution per gram of phosphor and 3.0 mole percent of $H_2S$ in water solution. The pH of the slurry was 2.8. The reflectance at 450 millimicrons increased from 74.5 percent to 85.5 percent and the green emission after copper contamination decreased to 15 percent of that of the water-treated control sample.

EXAMPLE IV

The calcine of Example I was slurried with 5 ml. of 1.0 molar potassium thiocyanate solution and 3.0 mole percent $H_2S$ in water solution. The pH of the slurry was 2.7. The reflectance at 450 millimicrons increased from 74.5 percent to 84.3 percent and the green emission relative to the control decreased to 13 percent.

EXAMPLE V

The calcine of Example I was slurried with 1.25 ml. (per gram of phosphor) of a solution containing 24 percent sodium thiosulfate and 2.2 percent sodium bisulfite to stabilize the thiosulfate at low pH, and with 3.0 mole percent $H_2S$ in water solution. The pH of the slurry was 3.3. The reflectance at 450 millimicrons was increased from 74.5 percent to 79.5 percent and the green emission relative to the (water-washed) control decreased to 20 percent.

EXAMPLE VI

The unwashed calcine of Example I was slurried with 5 ml. of 10 percent thiourea solution and 2 ml. of 0.1 molar sodium sulfide solution per gram of phosphor. The pH of the slurry was 11.3. The reflectance at 450 millimicrons increased from 74.5 percent to 83.2 percent and the green emission relative to the water-washed control decreased to 24 percent.

EXAMPLE VII

Eight samples of the calcine of Example I were each treated with 5 ml. of 10 percent thiourea solution per gram of phosphor and varying molar percents of $H_2S$ gas in water solution. The table below summarizes the resultant properties of the treated samples.

Table 1

| Molar percent of $H_2S/ZnS$ | pH of Slurry | Reflectance at 450 Millimicrons | Green emission (percent of water washed control) |
|---|---|---|---|
| 0 | 6.9 | 87.5 | 95 |
| 0.3 | 3.6 | 92.0 | 55 |
| 0.6 | 3.1 | 91.5 | 38 |
| 1.8 | 2.6 | 91.5 | 12 |
| 2.4 | 2.5 | 92.8 | 17 |
| 3.0 | 2.2 | 89.9 | 23 |
| 4.5 | 2.3 | 90.9 | 57 |
| 7.5 | 2.4 | 92.0 | 72 |

EXAMPLE VIII

Twenty grams of the calcine prepared as described in Example I was slurried with a treating solution of water containing 20% sodium thiosulfate and 2% sodium metabisulfite. Glacial acetic acid was added slowly, with stirring, until a pH of 3.5 to 4 was obtained in the slurry. Stirring was continued for 1 hour, the acid thiosulfate solution was filtered off, and the phosphor washed with pure water and dried. The treated phosphor was slurried in a solution of 100 mls. of pure water into which was bubbled $H_2S$ gas at the rate of 135 cc./minute. Three minutes after the $H_2S$ bubbling was commenced 1 ml. of a 3.1 molar solution of purified zinc sulfate was added dropwise. The $H_2S$ addition was continued for a total of 10 minutes. The solid was then allowed to settle for 10 minutes and the liquid decanted. The treated phosphor was stirred in 100 mls. of pure water for 5 minutes, allowed to settle again for 10 minutes and the solution decanted. The phosphor was then dried thoroughly in an oven at 120° C. The resultant phosphor had excellent body color and poison resistance. The green emission and reflectance were equivalent to the results obtained in Example V.

EXAMPLE IX

A blue-emitting silver-activated zinc sulfide phosphor was prepared by calcining pure zinc sulfide with a silver compound ($AgNO_3$) equivalent to 0.028% silver based on the weight of zinc sulfide. The material was allowed to cool, was washed with distilled water, and was then reheated with magnesium chloride at 210° C. for 18 hours. Ten grams of the phosphor was slurried with a treating solution of water containing 20% sodium thiosulfate and 2% sodium metabisulfite by the procedure described in Example VIII. Five portions of the treated phosphor each were slurried for 5 minutes at room temperature with a 100 ml. solution of purified zinc sulfate and pure water into which was bubbled $H_2S$ gas at a rate of 460 cc./minute with stirring. The grams of zinc sulfide formed per gram of phosphor are set forth in the table below. The solid of each slurry was allowed to settle for 10 minutes, the liquid was decanted, and the product stirred for 5 minutes in 100 mls. of hot, pure water. The wash procedure was repeated. The product was died in an oven at 120° C. and then sieved through a 325 mesh screen. The following table summarizes the effect of the zinc sulfide coating on the phosphor brightness under U.V. excitation (2537 A.) and the green emission characteristics of the five phosphor samples when compared with an untreated control phosphor.

*Table II*

| Gm. ZnS/Gm. Phosphor | Effect of ZnS Coatings on Phosphor Brightness | Green Emission |
|---|---|---|
| 0.09 | Brightness satisfactory | None. |
| 0.03 | Equivalent to control | Do. |
| 0.009 | ------do------ | Barely detectable. |
| 0.003 | ------do------ | Slight amount. |
| 0.0009 | ------do------ | Do. |

It was noticed that as the coating weight of zinc sulfide per gram of phosphor increases the brightness decreases and as the zinc sulfide coating weight decreases the green emission increases. The reflectances of the above treated phosphors were comparable to those obtained in the preceding examples.

Silver-activated zinc sulfide phosphors can be slurried with a solution containing a non-basic silver complexing agent and a sulfide compound to give phosphors with improved poison resistance and white body color. Generally, there are no more than a few hundred parts per million of silver sulfide on the surface of a silver-activated calcine after firing and washing in $H_2O$. To promote rapid cleaning of the phosphor surface an excess of silver complexing ions should be present. The concentration and amount of the treating solution containing the silver complexing agent may thus vary over a broad range, optimum values of which will be readily determinable by persons versed in art. The concentration will depend on the ingredients of the treating solution, treating time, temperature, amount of discoloration it is desired to remove, etc. The useful amount of the treating solution is controlled to avoid the handling of excess liquids, 2 to 5 mls. per gram of phosphor proving practical. Generally, a concentration of 5 percent and higher of the silver complexing agent is specifically preferred, based on the weight of the treating solution. Any amount up to saturation of the solution may be conveniently used. A preferred range of concentration is from 1 to 50 percent. The non-basic silver complexing agent present is preferably thiourea, but alkali and alkaline earth metal thiosulfates stabilized with alkali metal bisulfite, and alkali and alkaline earth metal thiocyanates may be used. In addition alkali and alkaline earth metal iodides and bromides may be used.

Other useful silver complexing agents include allylthiourea, alkyl substituted thioureas, e.g., methyl, ethyl, etc., and thiosemicarbazide with the complex stability constant greater than $10^7$ with silver ion. Thiobenzanilide, thioacetamide, thiouracil, thioacetanilide and thiocarbanilide are also useful compounds. Selenourea compounds with complex stability constants greater than $10^7$ with activator metal ion are also useful in this invention.

The treatment solution also contains a sulfide compound which can be present in from 0.3 to 4.5 mole percent, preferably however, the inorganic sulfide compound is present in 1.8 mole percent quantities. Lower amounts than 0.3 mole percent of sulfide compound can be used effectively, however, particularly when the solution pH at which the zinc sulfide coating is formed is relatively high. Hydrogen sulfide is the preferred sulfide compound, but water-soluble sulfides such as alkali sulfides including ammonium sulfide and alkaline earth sulfides may also be used. It is necessary when the water-soluble sulfides other than $H_2S$ are used, however, to adjust the final pH, depending on the silver complexing agent to insure complexing action. Generally the hydrogen sulfide is dissolved in water and a non-basic silver complex solution then combined with the sulfuretted water in preparation of the single wash solution. Alternate addition procedures are equally effective, however.

The type of phosphors which can be treated by this invention are zinc sulfides which have been silver-activated and halide-fluxed and then calcined. The phosphor should not be washed prior to treatment by the one step process. Suitable flux compounds include the mixture of barium and strontium chlorides previously described, sodium chloride, and other alkali and alkaline earth halides known in the art. While the subject process is most useful in treating silver-activated zinc sulfide type phosphors, it is also applicable to other activators such as copper and gold.

The single bath treatment is preferred because it improves the poison resistance of the phosphor almost instantaneously with the improvement of the body color, thereby preventing contamination of the phosphor. An alternate procedure, one involving two separate bath treatments, may also be used. This two step procedure consists of: (1) cleaning off the surface silver of the phosphor by immersing the phosphor in a solution comprised of acid and a non-basic silver complexing agent and (2) treating the cleaned surface with a solution comprised of zinc and sulfide ions. Acids which may be used in solution (1) include acetic acid, sulfuric acid, hydrochloric acid, phosphoric acid, nitric acid and sulfurous acid. Acid yielding salts, e.g., sodium bisulfate, also may be used. Preferred acids include acetic acid, sulfuric acid, hydrochloric acid and nitric acid. The zinc ion may be supplied in solution (2) in the form of the chloride, sulfate, nitrate or other soluble zinc salts. The non-basic silver complexing agents and sulfide ion compounds are as previously described.

An alkaline slurry has utility in the instant invention when the dry calcine is placed directly into the solution but improved surface cleaning is obtained when the phosphor is placed in an acidic slurry. The acidic slurry is particularly preferred when the weaker complexing agents, e.g., bromides, thioacetamide, thioacetanilide, thiobenzanilide, thiouracil and thiocarbanilide, are used. Free hydrogen ion concentration in the slurry normally must be higher with the weaker complexing agents. The lower limit of hydrogen ion concentration equals $10^6/K$, where K is the stability constant of the complexing agent with the metal activator. The complexing agent should be present in the active complexing form, i.e., not in protonated form. The upper limit of hydrogen ion concentration is reached when the complexing agent is about 90 percent in the inactive protonated form and about 10 percent is unprotonated. Expressed quantitatively, the upper limit of free hydrogen ion concentration should be no greater than $10^{-13}/K_B$ where $K_B$ is the basic dissociation constant of the complexing agent.

The treated phosphors of this invention can be used wherever conventional luminescent phosphors are ordinarily employed. The phosphors are especially useful because of the improved body color, emission brightness and resistance to contaminants. The phosphors are useful in the manufacture of cathode-ray tube screens, and both black and white and color television screens. Other uses for the phosphors include: fluoroscopic screens, X-ray intensifying screens, miniature radiographic screens, screens for electron microscopy and oscilloscopes, etc.

The instant one or two solution treatment produces excellent phosphors with white body color and enhanced resistance to contamination by a simple inexpensive procedure. The white body color obtained by the invention treatment is more thermally stable than that of phosphor calcines which have only been washed with a solution containing non-basic silver complexing agents. The preferred single solution treatment is especially advantageous not only from an economic viewpoint but because the problem of handling waste treatment liquids is decreased.

Since many apparently widely different embodiments of this invention may be made without departing from the spirit and scope thereof, it is to be understood that this invention is not limited to the specific thereof except as defined in the appended claims.

What is claimed is:

1. A process for improving the body color and resistance to poisoning by metallic impurities of a zinc sulfide phosphor activated with a metal selected from the group consisting of silver, copper and gold which comprises contacting the phosphor in aqueous medium with at least 1 percent by weight solution of a water-soluble complexing agent for said metal activator having a stability constant, K, with the metal activator greater than $10^7$, sufficient zinc ions and a water-soluble sulfide to form a zinc sulfide coating on said phosphor equivalent to about 0.09 to 9.0 percent zinc sulfide based on the weight of the original phosphor, said aqueous medium having a free hydrogen ion concentration ranging from $10^6/K$ to $10^{-13}/K_B$ where $K_B$ is the basic dissociation constant of the complexing agent.

2. A process for improving the body color and resistance to poisoning by metallic impurities of a zinc sulfide phosphor activated with a metal selected from the group consisting of silver, copper and gold which comprises contacting the phosphor in acidic aqueous medium with at least 1 percent by weight solution of a water-soluble complexing agent for said metal activator, sufficient zinc ions and a water-soluble sulfide to form a zinc sulfide coating on said phosphor equivalent to about 0.09 to 9.0 percent zinc sulfide based on the weight of the original phosphor, the complexing agent having a stability constant, K, with the metal activator greater than $10^7$ and being selected from the group consisting of thioamide compounds and ammonium, alkali and alkaline earth metal thiocyanates, iodides, bromides and thiosulfates.

3. The process of claim 2 wherein the water-soluble complexing agent is thiourea.

4. The process of claim 2 wherein the water-soluble sulfide is $H_2S$.

5. A process for improving the body color and resistance to poisoning by metallic impurities of silver-activated, halide-fluxed phosphor particles which comprises slurrying zinc sulfide phosphor particles having at least 0.3 mole percent water-soluble zinc ions on their surface in an aqueous medium containing at least 1 percent by weight solution of a water-soluble silver complexing agent having a stability constant, K, with silver activator greater than $10^7$ and from 0.3 to 4.5 mole percent of a water-soluble sulfide, the resulting slurry having a free hydrogen ion concentration from $10^6/K$ to $10^{-13}/K_B$ where $K_B$ is the basic dissociation constant of the complexing agent.

6. The process of claim 5 wherein the water-soluble silver complexing agent is selected from the group consisting of thioamide compounds and ammonium, alkali and alkaline earth metal thiocyanates, iodides, bromides, and thiosulfates.

7. The process of claim 5 wherein the water-soluble sulfide is $H_2S$.

8. The process of claim 5 wherein the water-soluble silver complexing agent is thiourea.

9. A process for improving the body color and resistance to poisoning by metallic impurities of phosphor particles activated with a metal selected from the group consisting of silver, copper and gold having been pre-treated with at least 1 percent by weight solution of a water-soluble complexing agent for said metal activator having a stability constant with metal activator greater than $10^7$ and being selected from the group consisting of thioamide compounds and ammonium, alkali and alkaline earth metal thiocyanates, iodides, bromides and thiosulfates, which comprises contacting the pre-treated particles in aqueous solution with sufficient zinc ions and a water-soluble sulfide to form a zinc sulfide coating on said phosphor equivalent to about 0.09 to 9.0 percent zinc sulfide based on the weight of the original phosphor.

10. The process of claim 9 wherein the water-soluble complexing agent is thiourea.

11. The process of claim 9 wherein the water-soluble sulfide is $H_2S$.

12. A process for improving the body color and resistance to poisoning by metallic impurities of halide fluxed, calcined zinc sulfide phosphor particles activated with a metal selected from the group consisting of silver, copper and gold which comprises placing said particles after calcination without further treatment into an aqueous medium containing at least 1 percent by weight solution of a water-soluble complexing agent for said metal activator having a stability constant, K, with metal activator greater than $10^7$ and 0.3 to 4.5 mole percent of a water-soluble sulfide to form a zinc sulfide coating on said phosphor equivalent to about 0.09 to 9.0 percent sulfide based on the weight of the original phosphor.

References Cited in the file of this patent

UNITED STATES PATENTS

| | | |
|---|---|---|
| 2,252,590 | Wolfson | Aug. 12, 1941 |
| 2,421,207 | Leverenz | May 27, 1947 |
| 2,615,849 | Markoski | Oct. 28, 1952 |
| 2,755,255 | Beutler et al. | July 17, 1956 |
| 2,965,580 | Umberger | Dec. 20, 1960 |
| 2,966,464 | Ropp | Dec. 27, 1960 |